United States Patent [19]

Covert et al.

[11] Patent Number: 4,932,499
[45] Date of Patent: Jun. 12, 1990

[54] GREASE APPLICATOR FOR WHEEL BEARINGS

[76] Inventors: Rick Covert, 7947 Grand Staff Dr., Sacramento, Calif. 95825; Robert G. Piercy, 64 Kennelford Cir., Sacramento, Calif. 95823

[21] Appl. No.: 382,408
[22] Filed: Jul. 20, 1989
[51] Int. Cl.$^5$ .............................................. F16C 1/24
[52] U.S. Cl. ................................. 184/5.1; 184/105.3; 184/105.1
[58] Field of Search ................... 184/5.1, 105.1, 105.3; 137/561 A; 384/398, 399, 400, 473; 239/590, 590.3, 590.5; 134/169 A, 169 R, 182; 74/594

[56] References Cited

U.S. PATENT DOCUMENTS

| | | | |
|---|---|---|---|
| 1,660,728 | 2/1928 | Stokes | 184/105.1 |
| 2,514,799 | 7/1950 | Ruberting et al. | 308/93 |
| 2,866,520 | 12/1958 | Sharp | 184/1 |
| 3,903,992 | 9/1975 | Chivukula et al. | 184/1 D |
| 4,106,816 | 8/1978 | August | 301/108 R |
| 4,190,133 | 2/1980 | Ploeger | 184/1 D |
| 4,293,057 | 10/1981 | Setree | 184/1 D |
| 4,355,702 | 10/1982 | Shultz | 184/1 D |
| 4,405,035 | 9/1983 | Shultz | 184/1 D |

FOREIGN PATENT DOCUMENTS

| | | | |
|---|---|---|---|
| 165517 | 10/1955 | Australia | 184/5.1 |
| 76794 | 6/1981 | Japan | 184/5.1 |
| 597766 | 2/1948 | United Kingdom | 184/5.1 |

Primary Examiner—Ira S. Lazarus
Assistant Examiner—Alan B. Cariaso
Attorney, Agent, or Firm—Jerry T. Kearns

[57] ABSTRACT

A tool for applying grease to the outer wheel bearing set of a spindle-mounted vehicle wheel is dimensioned for engagement with the wheel hub bore after the wheel's grease cap is removed. A pair of nested cylinders connected to a pressurized grease source form an annular passage for delivery of grease into the outer wheel bearing. The inner cylinder covers the spindle and wheel retaining hardware while the outer cylinder engages the outer rim of the wheel hub bore.

9 Claims, 1 Drawing Sheet

GREASE APPLICATOR FOR WHEEL BEARINGS

BACKGROUND OF THE INVENTION

1. Field Of The Invention

The present invention relates generally to tools for greasing vehicle wheel bearings and more particularly to an applicator for rapidly and efficiently delivering grease to bearings without the necessity of removing the wheel-retaining hardware, nor of raising the wheel off the ground.

2. Description Of The Related Art

Two wheels of the great majority of present day motor vehicles are mounted on non-rotating axles called 37 spindles." The wheel hub is mounted for rotation around the spindle by means of a pair of bearing sets, each set comprising a plurality of either rollers or balls. The bearing sets run between inner and outer races, the inner being fitted snugly on the spindle, the outer being fitted snugly in the bore of the wheel hub.

Each bearing set pair comprises an inboard bearing set which provides support for the hub on the end of the spindle proximal to the vehicle, and an outboard bearing set which supports the hub nearest the spindle's distal end. Each spindle, has means at its distal end for accommodating wheel-bearing bearing retaining hardware. This hardware commonly comprises a bearing-retaining washer and an adjusting nut which engages threads at the distal end of said spindle. A cotter pin through the spindle end prevents loosening of the nut.

The bearing sets of such spindle-mounted wheels require periodic regreasing both to reduce friction and to prevent dirty and gritty grease from damaging the bearings. This labor-intensive process first requires removal of the wheel and tire, and then the grease cap. Then the cotter pin, nut and washer are removed from the spindle, after which the bearing sets may be taken from their races and greased. If the wheel's brakes are of the disc-type, the caliper and rotor present additional obstacles in this task.

After the bearings have been cleaned and re-greased they are re-installed along with the hub on the spindle. One then replaces the washer and adjusts the bearing play by rotating the hub and tightening the nut to that optimum position in which it neither vibrates nor binds. Following this, the cotter pin and grease cap are installed. Only then may the wheel and tire be mounted on the hub because, if mounted before adjusting the bearing, the weight of the wheel and tire interfere with proper bearing adjustment. Thus, considerable effort must be expended merely to remove the bearings, and then to replace them after cleaning and re-greasing.

The cleaning and re-greasing process is itself a dirty, messy job and may also be labor-intensive. Traditionally, one simply held each bearing set in the palm of the hand and pressed clean grease into it until all the old grease was forced out. To avoid this, several devices have been developed to apply the grease in a cleaner, more effective manner. Examples of such devices can be found in U.S Pat. No. 2,866,520 issued to Sharp in 1957, and U.S. Pat. Nos. 4,355,702 and 4,405,035 issued to Shultz in 1982 and 1983, respectively. Each offers a mechanism for urging clean grease into a bearing set. Although these devices eliminate some unpleasant handling of bearings during the cleaning and re-greasing process, their use fails to eliminate the need to remove the wheel-retaining hardware for access to the bearings.

U.S. Pat. No. 4,293,056 issued to Setree in 1981 discloses a grease applicator which must be inserted through the bore of the hub while the bearings are in place and therefore requires removal of the hub from the spindle.

The prior art also includes devices for re-greasing wheel bearings without the removal of the wheel hub from the spindle. One such prior art grease applicator is shown in U.S. Pat. No. 2,514,799 issued to Rubertino, et al. in 1950. That device includes a disc-shaped member having a central aperture which receives the wheel's spindle after the wheel-retaining hardware has been removed. Rubertino's disk-shaped member is provided with a grease fitting and channels for directing grease to the wheel's outboard bearings.

Rubertino's device is inefficient in that the wheel-retaining hardware must be removed and replaced to permit its use. Whenever an adjusting nut is disturbed, the bearing play must be readjusted; therefore, Rubertino's device cannot be used without removal of the wheel and tire as well. Thus, the vehicle's wheel must be raised off the ground. None of these problems arise in using the present invention.

U.S. Pat. No. 4,190,133 issued to Ploeger in 1980 and U.S. Pat. No. 4,106,816 issued to August in 1978 show grease applicators which are designed to remain in place on the wheel hub during normal operation of the vehicle. Both include grease fittings and spring-loaded pistons for continuously urging grease toward the bearing. These devices are intended for use on boat trailers where bearings endure high-speed, high-temperature use followed by immersion in cold water. Upon inspection, it is apparent that either Ploeger's device or August's device could be installed temporarily to re-grease a wheel's bearings on a periodic basis with the wheel in place. However, neither device offers means for avoiding wasteful loading of grease upon the spindle end and nut. Neither are these devices able to deliver a discreet annular charge of grease directly into the bearing set of the wheel.

Chivukula, et al in U.S. Pat. No. 3,903,992 issued in 1975 shows a device for greasing the bearings of such a rotating shaft as may be found in an electric motor. Chivukula's device has grease inlet and outlet ports on opposite sides of the bearing. Grease is made to flow from one to the other by means of a grease slinger plate mounted on the shaft, said plate having canted vanes. Such a device could not be used to re-grease vehicle bearings since it is impossible or impractical to inject new grease behind a wheel bearing while mounted in the wheel and further, a stationary spindle could not drive a slinger plate to promote grease flow.

SUMMARY OF THE INVENTION

The invention comprises a wheel bearing grease applicator tool for engagement with the hub of a spindle-mounted vehicle wheel after the grease cap has been removed. The applicator is adapted for connection to either a hand or pneumatically-driven source of pressurized bearing grease, and its structure is such that an annular charge of grease is extruded into the wheel hub bore and thence around the balls or rollers of the outboard bearing set. Old grease is driven out of the bearings by this action and replaced with new.

The applicator comprises a hollow outer cylinder having means at its aft end for connection to a pressurized grease source. The opposite, forward end of the outer cylinder is open and is adapted to mate with the wheel hub. The preferred embodiment's outer cylinder has an external diameter at its forward open end that securely fits the inside diameter of the hub's bore. A step or ridge may be provided adjacent the open end to limit the distance the applicator travels into the bore.

A second smaller-diameter hollow cylinder is concentrically mounted, or nested, within the outer cylinder, and has its aft end closed and its forward end open. The open end of the smaller, inner cylinder is adapted to fit over the spindle's adjusting nut and cotter pin, and preferably to seat against the washer when the applicator is in place. The space between the external surface of this smaller inner cylinder, and the internal surface of the larger one surrounding it, defines an annular grease passage.

The applicator herein is adapted to lubricating only the outboard bearing set; the inboard bearings are inaccessible without removing the wheel. However, it appears not to be necessary to grease the inners as frequently as the outers because, for whatever reason, outboard bearings are known to fail much more frequently than their inboard counterparts.

Regreasing of any bearing set improves its service life. But heretofore, greasing outboard bearings several times between inboard bearing grease jobs yielded no great increase in efficiency because the bearings and wheel retaining hardware had to be disassembled in either case. Now, use of the present invention allows the layperson and trained mechanic alike to give outboard bearings the extra attention required, in a fraction of the time and effort previously needed.

It is thus an object of this invention to provide a novel tool for applying grease to the wheel bearings of vehicles in a rapid and efficient manner, without requiring raising the vehicle or removal of its wheel-retaining hardware.

Another object of the invention is to provide means for rapidly greasing vehicle wheel bearings which requires that only the wheel's grease cap be removed.

A further object of the invention is to provide a wheel bearing greasing tool for temporary engagement with a wheel hub in place of the grease cover thereof, wherein the tool extrudes an annular charge of grease into said hub's bore and into the rollers or balls of the wheel's outboard bearing set.

Another object of the invention is to provide a simple wheel bearing greasing tool which directs grease only to the bearing, leaving the surrounding area relatively clean and grease-free.

An additional object of the invention is to provide means for frequently greasing vehicle wheel bearings without removing the wheel-retaining hardware and, at the same time, without adding extra hardware permanently to the wheel's hub.

A still further object of the invention is to provide a wheel bearing greasing tool able to be used by a lay person without the necessity of engaging a trained mechanic to adjust the bearings afterward.

Yet another object of the invention is to provide a wheel bearing greasing tool with the foregoing attributes that is easily and effectively used with a hand-operated grease gun.

These and other objects and advantages of the invention will become apparent from the following detailed description and the drawings.

DETAILED DESCRIPTION OF PREFERRED EMBODIMENTS

Figure 1:
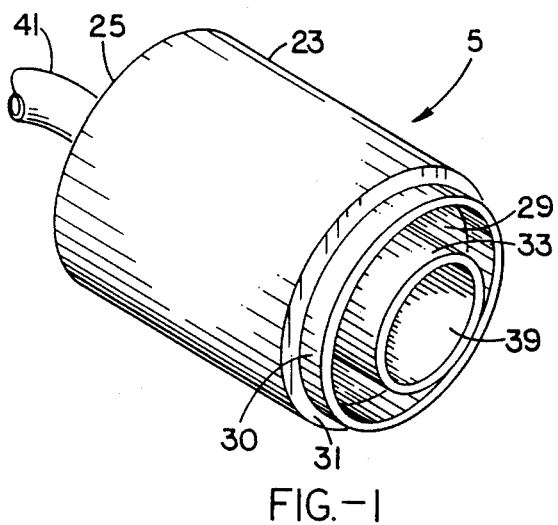
FIG. 1 is a perspective view showing the grease applicator of the present invention.
Figure 2:
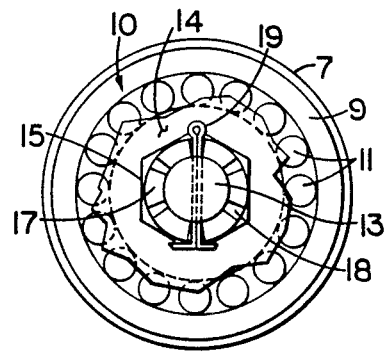
FIG. 2 is an end view into the bore of a wheel hub with the grease cap removed and the washer partly broken away to show the bearings.
Figure 3:
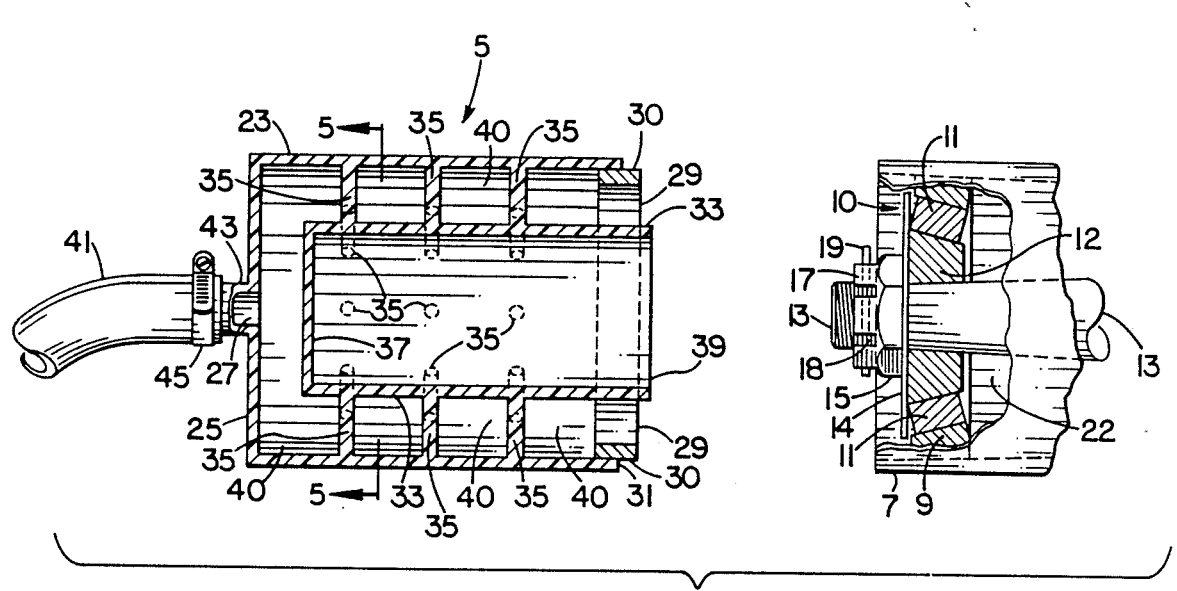
FIG. 3 is a sectional view of the grease applicator of FIG. 1 adjacent a cut-away side view of the wheel hub of FIG. 2.

Referring now specifically to the drawings, FIGS. 1 and 3 show the preferred grease applicator generally referred to by reference numeral 5. Applicator 5 is adapted for engagement with wheel hub 7 of FIGS. 2 and 3, hub 7 normally having a drum (not shown) attached thereto for supporting a wheel.

As in FIG. 3, outer race 9 surrounding outboard bearing set 10 resides in the bore defined by the annular internal surface of hub 7. Outer race 9 guides rollers 11 of set 10 which are also guided by inner race 12. Inner race 12 fits snugly over non-rotating spindle 13, said spindle having threads at its distal end. Bearing-retaining washer 14 is mounted between bearing set 10 and castled adjusting nut 15, said nut residing on the threaded end of spindle 13. Castled nut 15 includes projections 17 which define a plurality of radial slots 18 to accommodate cotter pin 19. Pin 19 seats in a hole (unnumbered) in spindle 13, its exposed ends being bound between projections 17, to fix nut 15's position after it has been properly adjusted.

Modernly it is common to employ a conventional hex nut in place of castled nut 15, the hex nut having a separate locking cap thereover with upstanding structures similar to projections 17. However, for simplicity herein, castled nut 15 with its projections will be discussed and shown as a single unit. Inventive applicator 5 works equally well on wheels having either of these styles of retaining hardware, as well as others.

Further, bearing rollers are commonly retained in a cage-like structure; but, this is eliminated from the following discussion, and the drawings, for simplicity.

A wheel hub such as hub 7 would also include an inboard bearing set (not shown) to support the wheel evenly. Space 22, shown in FIG. 3, between the two bearing sets is empty except for the spindle.

FIG. 3 also includes a sectional view of inventive grease applicator 5 about to be inserted into the bore of wheel hub 7. Applicator 5 is preferably constructed of rigid tubular material, PVC tubing being one material that has yielded satisfactory results. However, other plastics or materials such as metal or rubber, or combinations thereof, may also work well.

Outer cylinder 23 of the applicator is hollow and has aft and forward ends. Aft end 25 of outer cylinder 23 is closed except for grease port 27 for delivery of grease to outer cylinder 23's interior. Cylinder 23's forward end 29 is open. Its external diameter should facilitate its secure receipt in the bore of wheel hub 7.

End 29 preferably engages the hub and seats in the bore just as a conventional grease cap does. One way to assure such a fit is to fix a ring matching the external dimensions of a grease cap's rim to the forward end of the applicator. As in FIGS. 1 and 3, the preferred embodiment includes annular metal skirt 30 pressed and frictionally bound into the forward end of outer cylinder 23.

Whether a separate metal skirt is employed or the skirt is continuous with cylinder 23 and of the same material, a ridge or step adjacent the open end of cylinder 23 is desirable. Such a step limits the distance of the cylinder's travel into the hub's bore. Thus, as shown in FIGS. 1 and 3, step 31 results from reduction of the external diameter of cylinder 23 to the diameter needed to fit securely into the hub.

Figure 5:
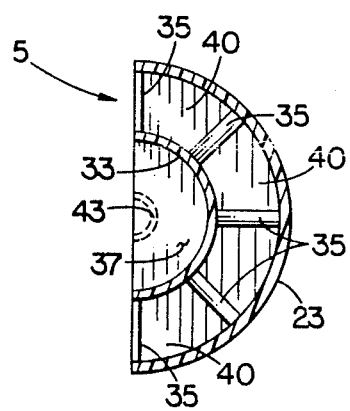
FIG. 5 shows a view taken along line 5—5 of FIG. 3.

A nested, concentrically-supported inner cylinder 33 is disposed inside outer cylinder 23. Inner cylinder 33 may be held in concentric relation to outer cylinder 23 by suspension means such as pins or spokes 35 shown in FIGS. 3 and 5. Other adequate suspension means will be obvious to those skilled in the art. For example, successful practice of the invention has been achieved by spanning the space between the inner and outer cylinders with several longitudinal ribs.

Inner cylinder 33 has aft and forward ends, these being identified by reference numerals 37 and 39, respectively. Aft end 37 is closed and nested deep within outer cylinder 23 near, but not obstructing, grease port 27. Forward end 39 is open.

Inner cylinder 33's internal diameter needs to be sufficient to fit over spindle 13's adjusting nut 15 and cotter pin 19. And, its external diameter preferably does not exceed the diameter of bearing-retaining washer 14.

Open end 39 of the inner cylinder should seat against washer 14 to assure good grease flow to the bearings. Depending upon the wheel to be greased, end 39 may project somewhat beyond outer cylinder 23's open forward end 29 as in FIGS. 1 and 3. In other cases, a secure fit with both the hub and washer may require that the ends of the two cylinders be flush, or that end 29 of the outer cylinder project beyond forward inner cylinder end 39.

Thus, the distance and relationship between the forward ends of the two cylinders depends on the distance and relationship between the bearing-retaining washer and the outer rim of the hub of the wheel to be greased. Ideally, when applicator 5 is engaged with hub 7 for grease delivery, forward end 39 of inner cylinder 33 should stop against washer 14, and step 31 of outer cylinder 23 should seat against the outer rim of the wheel's hub.

Skirt 30's length from step 31 should be such that its travel into the bore is limited to that distance necessary for a good seal, without obstructing the sometimes narrow width grease passage space between the outer edge of washer 14 and the inner surface of the hub.

The space between the inner cylinder's external surface and the outer cylinder's internal surface defines an annular grease passage 40 that, at the forward end of applicator 5, preferably approximates the width of the space between washer 14's outer edge and the inner surface of the hub. Grease is fed to passage 40 from a pressurized grease source through grease line 41. When applicator 5 is engaged as described above, grease may be delivered under pressure from passage 40 directly into to bearing set 10.

Line 41 is bound to applicator 5 by connecting means such as flange 43 adjacent grease port 27 in outer cylinder 23. Clamp 45 helps hold line 41 in place, but many other connecting means are available. For example, aft end 25 of the outer cylinder may have a threaded hole in place of flange 43 for receiving a threaded rigid pipe or tube.

Figure 4:
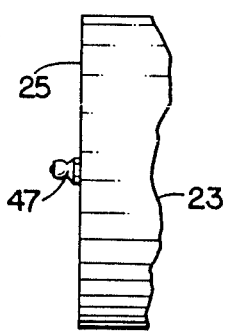
FIG. 4 shows an alternate construction of the applicator in which a grease fitting is provided for delivery of grease thereto.

One alternative connecting means, nipple 47, is shown in FIG. 4. Nipple 47 facilitates connection of applicator 5 to a grease source via a standard grease gun tip (not shown). Of course, other grease source connecting means are also well-known in the art.

In use of the invention, one simply removes the grease cap from a vehicle's wheel and inserts applicator 5 into the bore of the wheel's hub. A charge of new grease of sufficient volume to replace the old grease in the bearings may then be delivered. Old grease, once displaced, naturally flows into empty space 22 toward the interior of the hub. Somewhat better penetration of the new grease may be achieved if the wheel is rotated a bit while greasing the bearings. For example, the vehicle may be rolled back and forth slightly. And, although it is not necessary, it is nevertheless possible to raise the vehicle and turn the wheel to and fro while performing the grease job.

Once the job is complete, either the applicator or the wheel may be rotated slightly while withdrawing the applicator from the bore of the hub. This action shears off the grease between the applicator's forward end and the bearings, and leaves minimal residue on adjacent hardware Thus, waste is avoided.

Modifications of the illustrated structure are possible and are considered to be within the scope of the invention. For example, step 31 in outer cylinder 23 may be replaced with a thin, outstanding ridge. Then, except for the ridge, the external diameter of the outer cylinder could be the same as the inside diameter of hub 7. Or, this ridge could even be eliminated; applicator 5 could then be inserted into the wheel hub until the end of the inner cylinder stopped against washer 14. In addition, many different suspension means may be envisioned for fixing the inner and outer cylinders in concentric relation.

Different embodiments of the invention are envisioned to accommodate different manufacturers hub, bearing and hardware configurations. And, an applicator having an inner cylinder axially adjustable with respect to its outer cylinder is contemplated. This could be accomplished, for example, by providing mating threads between the inner and outer cylinders, the threads having gaps to facilitate grease flow.

Those skilled in the art will envision many other possible variations of the structure disclosed herein that nevertheless fall within the scope of the following claims. And, alternative uses for this grease applicator may later be realized. Accordingly, the scope of the invention should be determined with reference to the appended claims, and not by the examples which have herein been given.

What is claimed is:

1. A grease applicator for use on a wheel bearing assembly including a hollow cylindrical hub, a spindle extending coaxially within the hub, an outboard bearing mounted on the spindle supporting the hub for rotation, a bearing retaining washer on the spindle abutting the outboard bearing and a nut in threaded engagement on an outer end of the spindle, said applicator comprising:

an outer hollow cylinder having a closed gift aft end and an open forward end;

an inner hollow cylinder having a closed aft end and an open forward end;

means securing said inner cylinder in nested relation within said outer cylinder, forming an annular grease passage;

means on said aft end of said outer cylinder for connecting said annular grease passage to a source of pressurized grease; and said forward end of said inner cylinder dimensioned for abutment with the bearing retaining washer.

2. The grease applicator of claim 1, wherein said means securing said inner cylinder in nested relation within said outer cylinder comprises a plurality of radial spokes extending between said inner and outer cylinders.

3. The grease applicator of claim 1, wherein said forward end of said outer cylinder terminates in a reduced diameter skirt, forming an annular step dimensioned for abutment with an outer circular end of the hub.

4. A grease applicator for use on a wheel bearing assembly including a hollow cylindrical hub, a spindle extending coaxially within the hub, an outboard bearing mounted on the spindle supporting the hub for rotation, a bearing retaining washer on the spindle abutting the outboard bearing and a nut in threaded engagement on an outer end of the spindle, said applicator comprising:

an outer hollow cylinder having a closed aft end and an open forward end;

an inner hollow cylinder having a closed aft end and an open forward end;

means securing said inner cylinder in nested relation within said outer cylinder, forming an annular grease passage;

means on said aft end of said outer cylinder for connecting said annular grease passage to a source of pressurized grease; and said annular grease passage having a width similar to the width of a space between an outer edge of the bearing retaining washer and an inner surface of the hub.

5. The grease applicator of claim 4, wherein said means securing said inner cylinder in nested relation within said outer cylinder comprises a plurality of radial spokes extending between said inner and outer cylinders.

6. The grease applicator of claim 4, wherein said forward end of said outer cylinder terminates in a reduced diameter skirt, forming an annular step dimensioned for abutment with an outer circular end of the hub.

7. A grease applicator for use on a wheel bearing assembly including a hollow cylindrical hub, a spindle extending coaxially within the hub, an outboard bearing mounted on the spindle supporting the hub for rotation, a bearing retaining washer on the spindle abutting the outboard bearing and a nut in threaded engagement on an outer end of the spindle, said applicator comprising:

an outer hollow cylinder having a closed aft end and an open forward end;

an inner hollow cylinder having a closed aft end and an open forward end;

means securing said inner cylinder in nested relation within said outer cylinder, forming an annular grease passage;

means on said aft end of said outer cylinder for connecting said annular grease passage to a source of pressurized grease;

said forward end of said outer cylinder dimensioned for sealing engagement with the hub;

said forward end of said inner cylinder projecting axially forwardly from said forward end of said outer cylinder, said forward end of said inner cylinder dimensioned for surrounding engagement over the outer spindle end, nut, and abutment with the bearing retaining washer; and said annular grease passage having a width similar to the width of a space between an outer edge of the bearing retaining washer and an inner surface of the hub.

8. The grease applicator of claim 7, wherein said means securing said inner cylinder in nested relation within said outer cylinder comprises a plurality of radial spokes extending between said inner and outer cylinders.

9. The grease applicator of claim 7, wherein said forward end of said outer cylinder terminates in a reduced diameter skirt, forming an annular step dimensioned for abutment with an outer circular end of the hub.

* * * * *